M. TAKEUCHI.
FISH LINE REEL AND CASE.
APPLICATION FILED APR. 10, 1917.

1,256,278.

Patented Feb. 12, 1918.

Inventor

Masayoshi Takeuchi
By Henry L. Reynolds.
Attorney

UNITED STATES PATENT OFFICE.

MASAYOSHI TAKEUCHI, OF SEATTLE, WASHINGTON.

FISH-LINE REEL AND CASE.

1,256,278.   Specification of Letters Patent.   Patented Feb. 12, 1918.

Application filed April 10, 1917. Serial No. 160,911.

*To all whom it may concern:*

Be it known that I, MASAYOSHI TAKEUCHI, a subject of the Emperor of Japan, and resident of the city of Seattle, county of King, and State of Washington, have invented certain new and useful Improvements in Fish-Line Reels and Cases, of which the following is a specification.

My invention relates to reels and cases for storing lines, and particularly fish lines. The object of my invention is to provide a cheap and convenient form of reel and case which is provided with storage space for fish hooks, sinkers, and other small objects of like kind which are likely to be used in connection with a fishing line.

In the accompanying drawings I have shown my invention embodied in the form of construction which is now most preferred by me.

Figure 1:
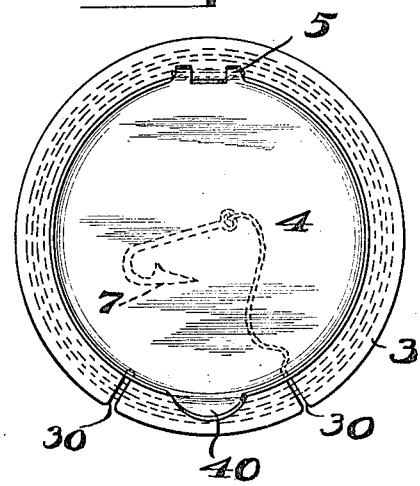
Figure 1 is a face view of the case.
Figure 2:
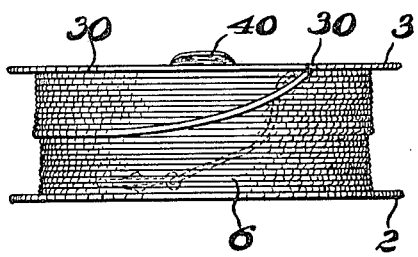
Fig. 2 is an edge view of the same.
Figure 3:
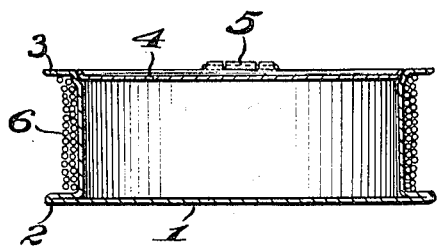
Fig. 3 is a section through the case.
Figure 4:
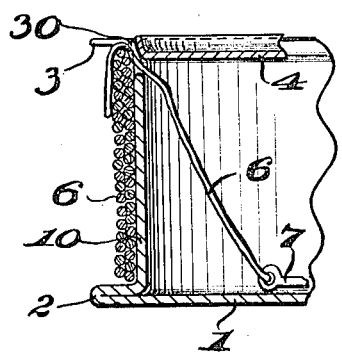
Fig. 4 is a partial section showing the manner of slitting one of the flanges so as to provide space for the entrance of the line within the storage chamber.

It is the object of my invention to provide a convenient type of reel upon which a fishing line may be wound so as to enable the same to be kept in orderly manner and to provide in the center thereof a storage chamber into which the hook and the sinker, if such be used, may be placed without removing the same from the line. The combined reel and case, as herein shown, is in the form of a shallow circular box 1, having flanges 2 and 3 at the sides thereof, these forming a space for the reception of the line 6 when wound thereon.

One side of this case is provided with an opening which, as herein shown, is substantially equal in diameter to that of the storage chamber. The relative size of these parts of the device is, however, unimportant, as the opening may be made equal to this diameter or less, as may be desired and found convenient.

The opening in this side of the case is closed in any suitable manner. As herein shown, the cap or closure 4 is hinged at 5 to one side of the casing and is of such size that its flange edge will fit tightly within the opening in the case and be held in position by friction. For convenience in raising the cover, a tab or grip 40 may be provided on the edge opposite the hinge.

The fishing line 6 is wound upon the casing in the manner shown. When the end which has the hook attached thereto is reached, this is passed into one or the other of notches 30, which are provided in one of the flanges and which extend down to such a point that they communicate with the interior of the case. This notch may be formed in the edge of the cap or closure 4, if desired. This forms a passage whereby the line may be passed into the storage chamber. The hook 7 is thus stored where it is out of the way and can do no damage.

What I claim as my invention is:

1. A fish line reel having a central storage chamber provided with a side opening and a closure therefor and having a line passing notch extending to the margin of the said opening.

2. A fish line reel comprising a box-like case having an opening in one face and a closure for said opening, the case having flanges extending about it to provide a line storing space, the edge of said opening having a notch for the passage of the line when the closure is in place.

3. A fish line reel comprising a box-like case open at one side and having flanges extending about it, and a plate adapted to close the side opening, one of said flanges having a line receiving notch communicating with the interior of the case.

Signed at Seattle, Washington, this 4th day of April, 1917.

MASAYOSHI TAKEUCHI.